United States Patent [19]

Hoare et al.

[11] Patent Number: 5,205,602
[45] Date of Patent: Apr. 27, 1993

[54] MOTOR VEHICLE BOOT INSERT

[75] Inventors: Brendan F. Hoare, Ballinasloe; Patrick E. Ryan, Loughrea, both of Ireland

[73] Assignee: B.E.T. Corporation Limited, Loughrea, Ireland

[21] Appl. No.: 653,351

[22] Filed: Feb. 8, 1991

[30] Foreign Application Priority Data

Feb. 9, 1990 [IE] Ireland .................................. 3873/89
Dec. 4, 1990 [IE] Ireland .................................. 4361/90

[51] Int. Cl.⁵ ............................................. B60R 13/01
[52] U.S. Cl. .................................. 296/39.1; 248/503; 410/78; 410/82; 410/95
[58] Field of Search .................. 296/39.1, 39.2, 38; 248/503, 503.1, 507, 510, 681; 410/77–79, 82, 2, 94–95; 220/84 H; 224/42.38, 42.4

[56] References Cited

U.S. PATENT DOCUMENTS

| | | | |
|---|---|---|---|
| 818,257 | 4/1906 | Kennedy | 296/39.1 X |
| 1,867,271 | 7/1932 | Larsen | 248/507 |
| 2,898,146 | 8/1959 | Yodenfreund | 296/39.1 |
| 3,362,672 | 1/1968 | Wigam | 248/507 |
| 3,387,814 | 6/1968 | Fischer | 248/507 |
| 4,027,892 | 6/1977 | Parks | 248/220.4 X |
| 4,134,345 | 1/1979 | Baldwin | 410/440 |
| 4,184,694 | 1/1980 | Porter | 410/82 X |
| 4,200,046 | 4/1980 | Koliba et al. | 410/94 |
| 4,333,678 | 6/1982 | Munoz et al. | 290/39.2 |
| 4,358,035 | 11/1982 | Heidecker | 224/42.42 |
| 4,718,584 | 1/1988 | Schoeny | 224/42.42 |
| 4,893,862 | 1/1990 | Hollenbaugh, Sr. | 296/39.1 |
| 4,960,301 | 10/1990 | Fry et al. | 296/39.2 |
| 5,007,671 | 4/1991 | Oprea | 296/39.2 |

FOREIGN PATENT DOCUMENTS

| | | | |
|---|---|---|---|
| 0022702 | 10/1982 | European Pat. Off. . | |
| 0174211 | 3/1987 | European Pat. Off. . | |
| 0266024 | 5/1988 | European Pat. Off. . | |
| 1140095 | 11/1962 | Fed. Rep. of Germany | 296/39.2 |
| 2403914 | 8/1974 | Fed. Rep. of Germany . | |
| 2741111 | 3/1979 | Fed. Rep. of Germany . | |
| 3106116 | 12/1982 | Fed. Rep. of Germany . | |
| 3626339 | 2/1988 | Fed. Rep. of Germany . | |
| 445870 | 11/1912 | France | 248/681 |
| 672912 | 1/1990 | Sweden . | |
| 8346 | 11/1915 | United Kingdom | 224/42.4 |
| 162204 | 4/1921 | United Kingdom | 296/42.38 |
| 1602294 | 11/1981 | United Kingdom . | |
| 2114073 | 8/1983 | United Kingdom . | |
| 2118109 | 10/1983 | United Kingdom . | |

*Primary Examiner*—Dennis H. Pedder
*Attorney, Agent, or Firm*—Scully, Scott, Murphy & Presser

[57] ABSTRACT

A removable motor vehicle boot insert (1) comprises two rigid insert portions (2, 3) which overlap at 10, 11 on assembly within a boot A to follow the contour of the boot A. Flexible wing portions (15, 16) of a side wall (6) of each insert portion (2, 3) urge the insert portions (2, 3) into engagement on assembly within the boot. Retainers (31) for releasably anchoring a container (30) to the insert comprises a screw (33) having an enlarged head (34) defining a cam surface and an extension defining a handle (35) for turning the screw. The cam surface of the screw head (34) engages in a groove (40) in opposed end walls of the container (30) to anchor the container in a desired position on the insert.

13 Claims, 5 Drawing Sheets

MOTOR VEHICLE BOOT INSERT

BACKGROUND OF THE INVENTION

This invention relates to a removable motor vehicle boot insert, particularly, but not exclusively, for cars.

A wide range of goods and materials are carried in car boots which are often soiled by dirt or grease from tools for example, or by spillage of petrol, oil or other materials from containers. The car boot can be somewhat difficult to clean. Also car boots generally have an irregular shape and therefore are difficult to protect and damage can be done to the boot interior when loading or removing items from the boot. Further, fragile materials carried in the boot may be thrown around a boot and damaged in transit.

Various constructions of boot inserts are known. For example, DE 2,741,111 A describes a luggage insert for a car boot comprising a plastics open-top box having a rim including a series of holes to which elastic fitting straps are hooked to secure packages in postion in the insert. EP 0,022,702 A describes a lining for a car boot made from semi-rigid sheet pre-shaped in the form of a trough of approximately the same shape as that of the interior of a boot. EP 0,266,024 A describes a liner for an automobile trunk of fibrous material. DE 3,106,116 A describes a tray for mounting in a vehicle.

DE 3,636,339 A describes a transport container insert for a car boot which is sub-divided by a number of plastic wall parts. DE 2,163,725 A and 2,403,914 A also describe constructions of boot inserts.

EP 0,006,604 A describes a device for use in the luggage compartment of a passenger vehicle comprising a base plate and a number of wall elements. WO 89/06613A describes a load securing panel for a bottom of a car or van having grooves for insertion of retaining plates.

There are a number of problems with the inserts described in these prior art specifications. They are generally expensive and are difficult to position and retain in a boot and are impractical to operate.

SUMMARY OF THE INVENTION

There is therefore a need for an improved construction of boot insert which is relatively cheap and easy to place in a boot and use. There is also a need for a boot insert which has an anchoring means which effectively anchors a container to the insert. There is further a need for a container for use with According to one aspect the invention provides a removable motor vehicle boot insert comprising at least two associated substantially rigid insert portions each having engagement means for assembly within a boot to substantially follow the contour of the boot.

In a particularly preferred embodiment of the invention each insert portion comprises a base and an upwardly directed side wall extending around at least part of the periphery of the base. Most preferably each insert portion defines an opentopped container.

In a preferred arrangement the engagement means comprises overlapping portions of the insert portions.

In a particularly preferred embodiment of the invention the boot insert includes integral retaining means for retaining the insert in position in a boot. Preferably the retaining means comprises a flexible wing portion on the side wall of each insert portion for engagement with the wall of a vehicle boot to urge the insert portions into engagement, on assembly.

In a particularly preferred embodiment of the invention the boot insert includes anchoring means for releasably anchoring a container to the insert. Most preferably the anchoring means comprises an anchoring member having an engagement portion which is movable from a disengaged position allowing movement of a container on the insert to an anchoring position engaged with a container. In one case the anchoring member is releasably mounted on the insert.

In one embodiment of the invention the anchoring member comprises a screw having a cam surface for engagement with a camming surface of a container. Preferably the cam surface is defined by the head of the screw. Preferably the head includes an extension forming a handle for movement of the screw. In a particularly preferred arrangement the camming surface of the container comprises a recess adjacent the base of the container. Conveniently, the recess is formed by a longitudinally extending groove for anchoring a container to the insert at a desired location.

In a particularly preferred embodiment of the invention the insert portions are formed with a plurality of spaced-apart locating portions for mounting anchoring members in a desired position on the insert, a container being retained by engagement between a pair of spaced-apart anchoring members embracing a container therebetween.

In another aspect the invention provides a boot insert for a vehicle comprising a base for supporting a container and anchoring means for anchoring a container to the insert, the anchoring means comprising a screw having a cam surface for engagement with a camming surface of a container to retain the container in a desired position on the insert.

In a further aspect the invention provides a container comprising a base and side wall means upstanding from the base wherein the container has engagement means for engagement by an anchoring means for anchoring the container to the boot insert.

BRIEF DESCRIPTION OF THE DRAWINGS

The invention will be more clearly understood from the following description thereof given by way of example only with reference to the accompanying drawings in which.

DETAILED DESCRIPTION OF PREFERRED EMBODIMENTS

Figure 3:
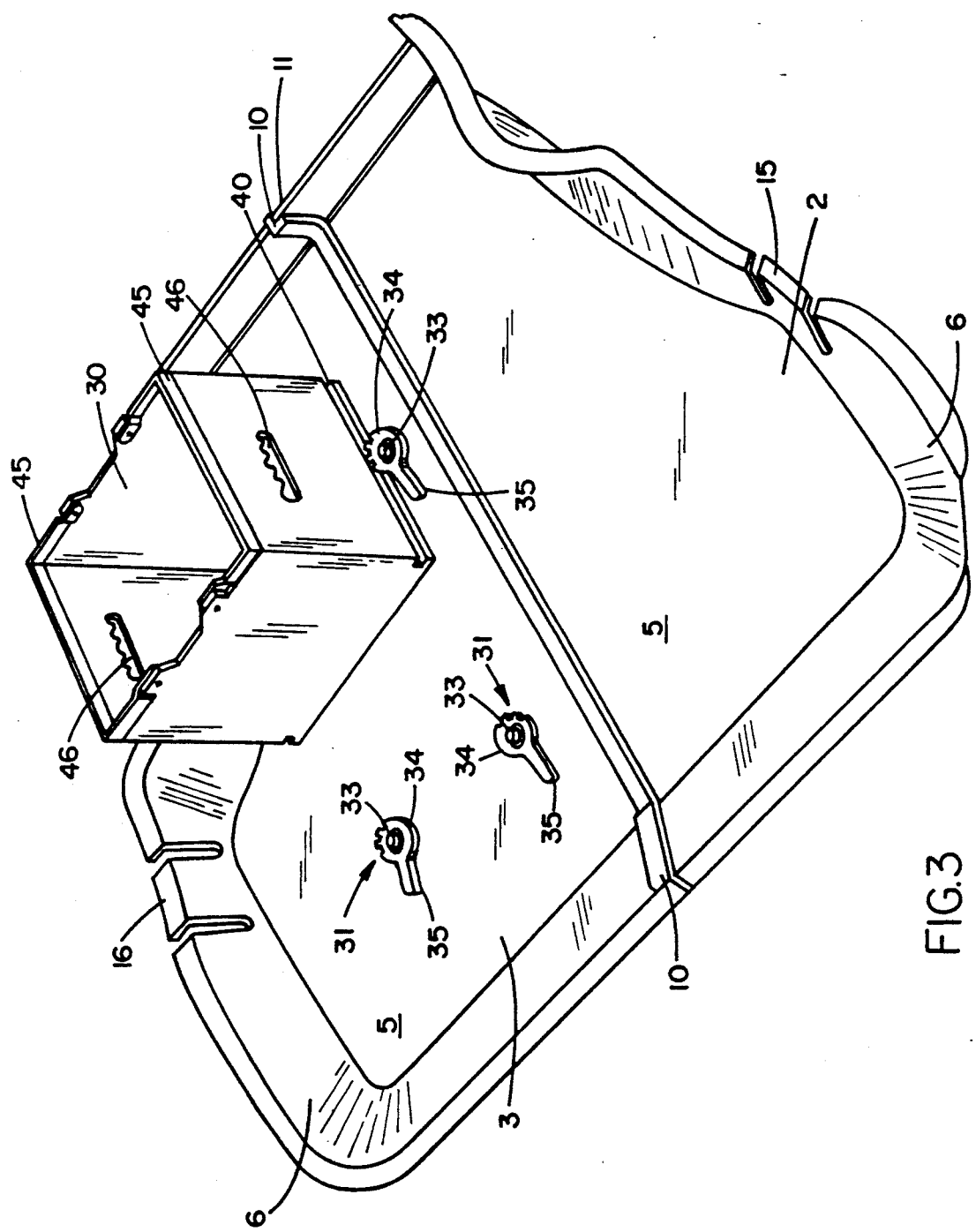
FIG. 3 is a perspective view of the boot insert in the assembled configuration, with a container in position.
Figure 4:
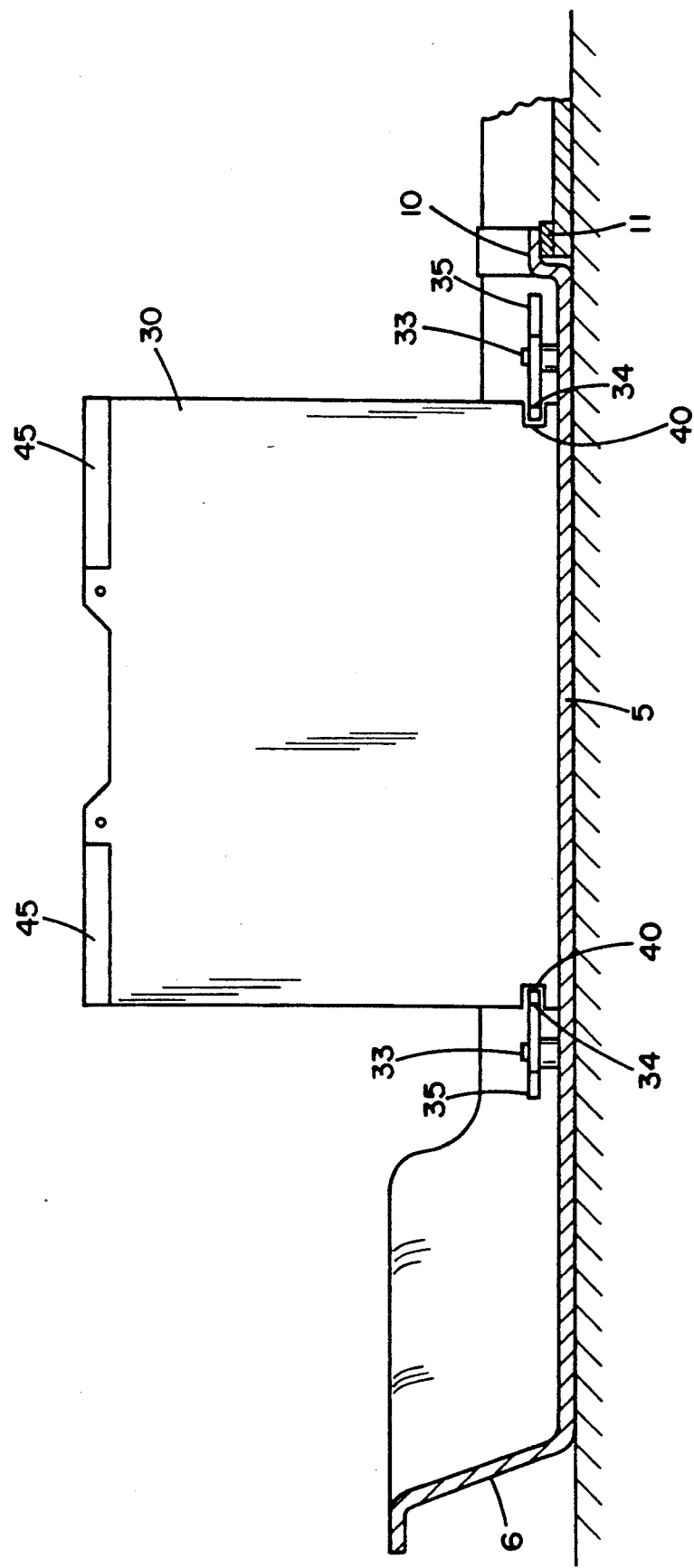
FIG. 4 is a cross-sectional view of part of the boot insert of FIG. 3.

Referring to the drawings there is illustrated a removable motor vehicle boot insert indicated generally by the reference numeral 1. The boot insert 1 comprises at least two associated substantially rigid insert portions 2, 3 each having engagement means for assembly within a boot A of a vehicle B to substantially follow the contour of the boot A. Each insert portion 2, 3 comprises a base 5 and an upwardly directed side wall 6 extending around at least part of the periphery and in this case fully around the periphery of the base 5 to define an open-topped container. The side wall means 6 includes engagement means defined by overlapping portions 10, 11 of adjacent side walls of the insert portion 2, 3 which are overlapped and engaged as illustrated in FIGS. 3 and 4, on assembly within a boot A of a vehicle B.

Figure 1:
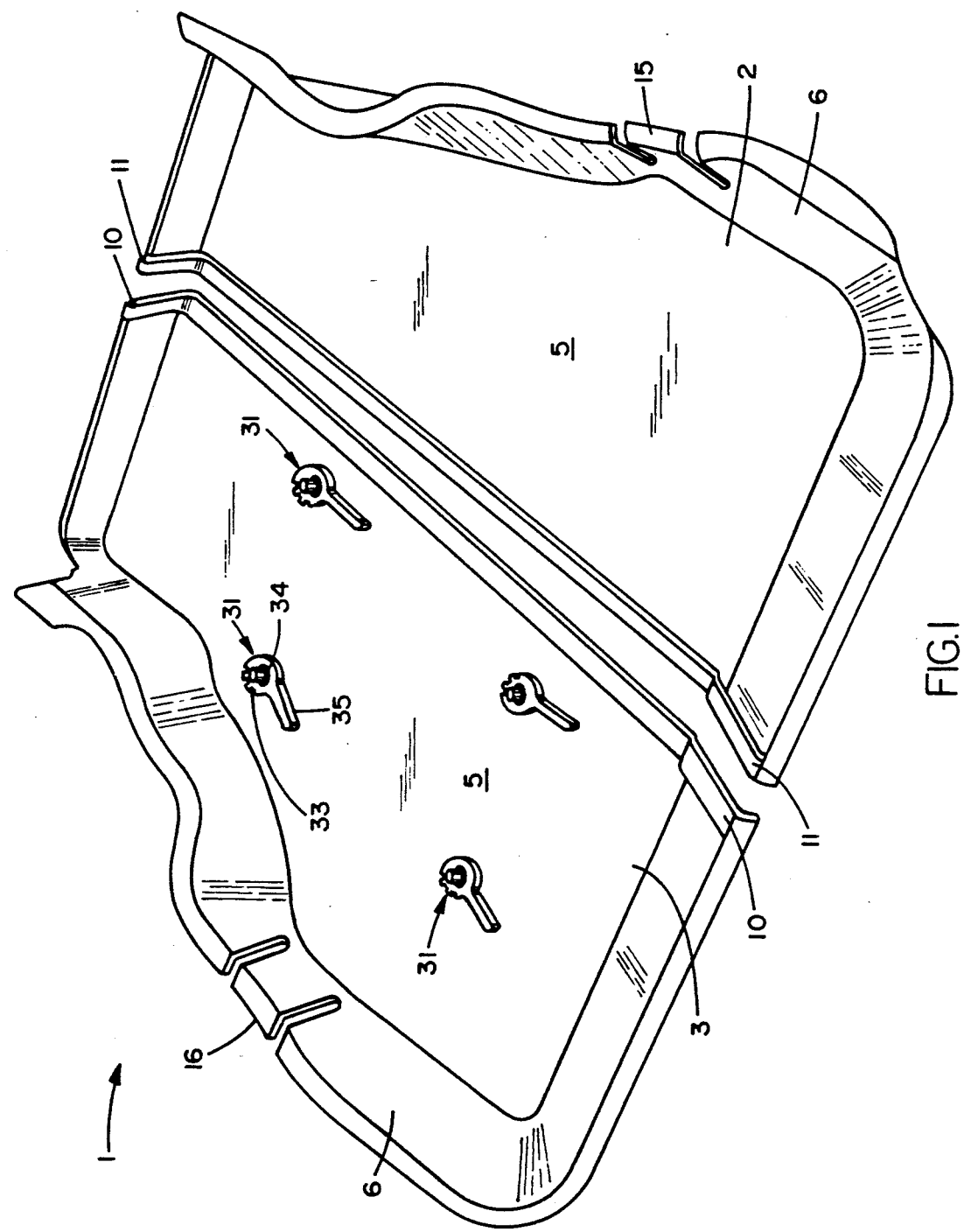
FIG. 1 is a perspective view of a boot insert according to the invention during assembly.
Figure 2:
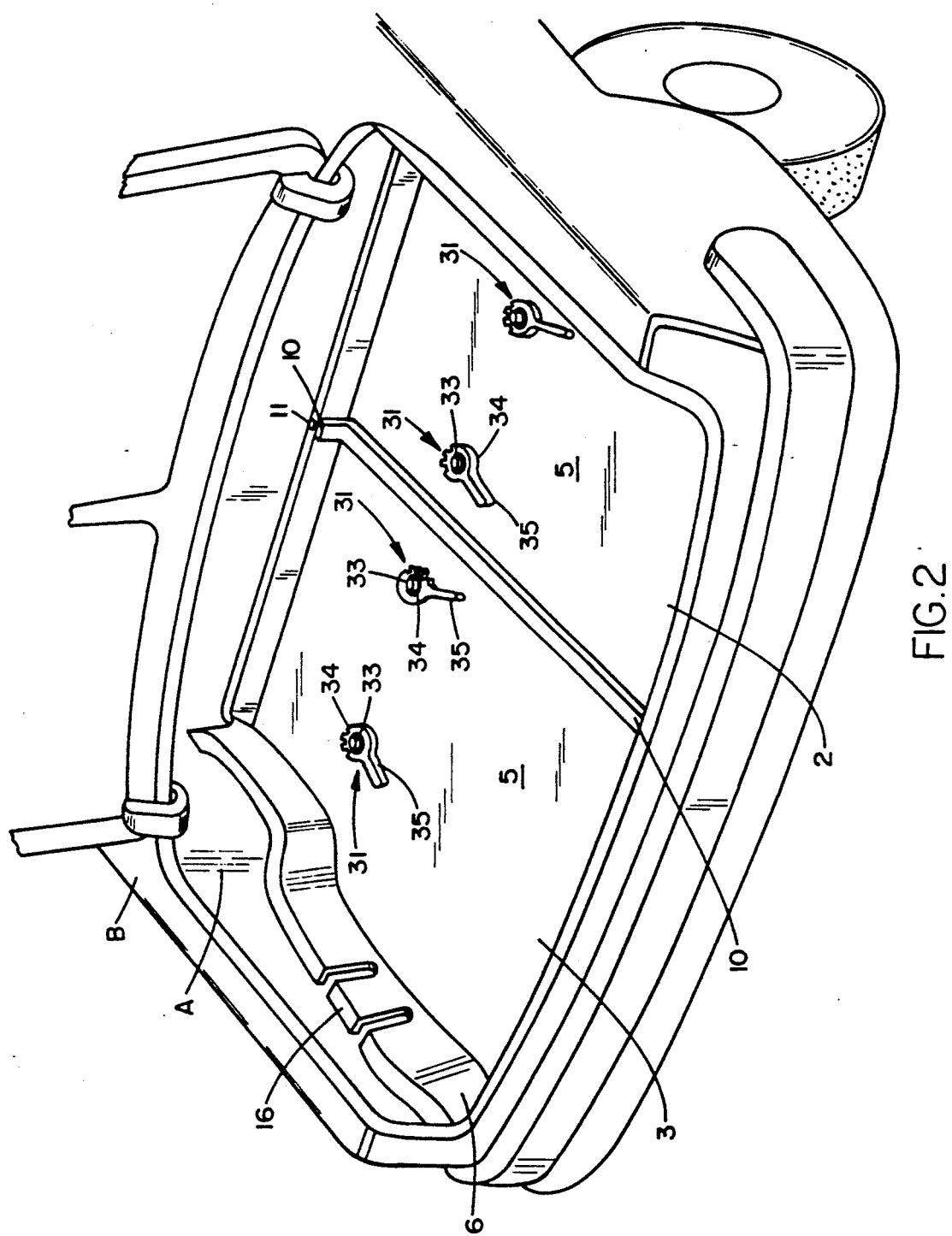
FIG. 2 is a perspective view of the boot insert assembled, and in use.

Integral retaining means for retaining the insert in position in a boot A in this case comprises a flexible wing portion 15, 16 of the side wall 6 of each insert portion 2, 3. The wing portions 15, 16 are formed as particularly illustrated in FIGS. 1 and 3 for engagement with the wall of a vehicle boot A to urge the insert portions 2, 3 into engagement on assembly within the boot. The wing portions 15, 16 effectively form spring elements which are biased against the wall of the boot B on insertion and which, when released by the user, urge the insert portions 2, 3 together so that the overlapping portions 10, 11 inter-engage to form a rigid boot insert on assembly.

The insert portions 2, 3 are sized and shaped to fit a particular size of boot A and are not designed to be universal to all boots. Rather, the boot insert is designed to closely follow the contours of the boot A of a vehicle on assembly so that the insert is rigidly and securely retained within the boot on assembly but which may be readily easily assembled within the boot and removed if required. Because each of the boot insert portions 2, 3 define open-topped containers, any spillage of material in one boot insert portion 2, 3 is confined to that portion thus protecting any goods in the other portion. Because the insert is in two parts, if desired, one part may be removed for cleaning or to expose a particular section of boot, for example for removal of a spare wheel.

The insert portions 2, 3 are preferably moulded from a rigid material such as polyethylene.

Figure 5:
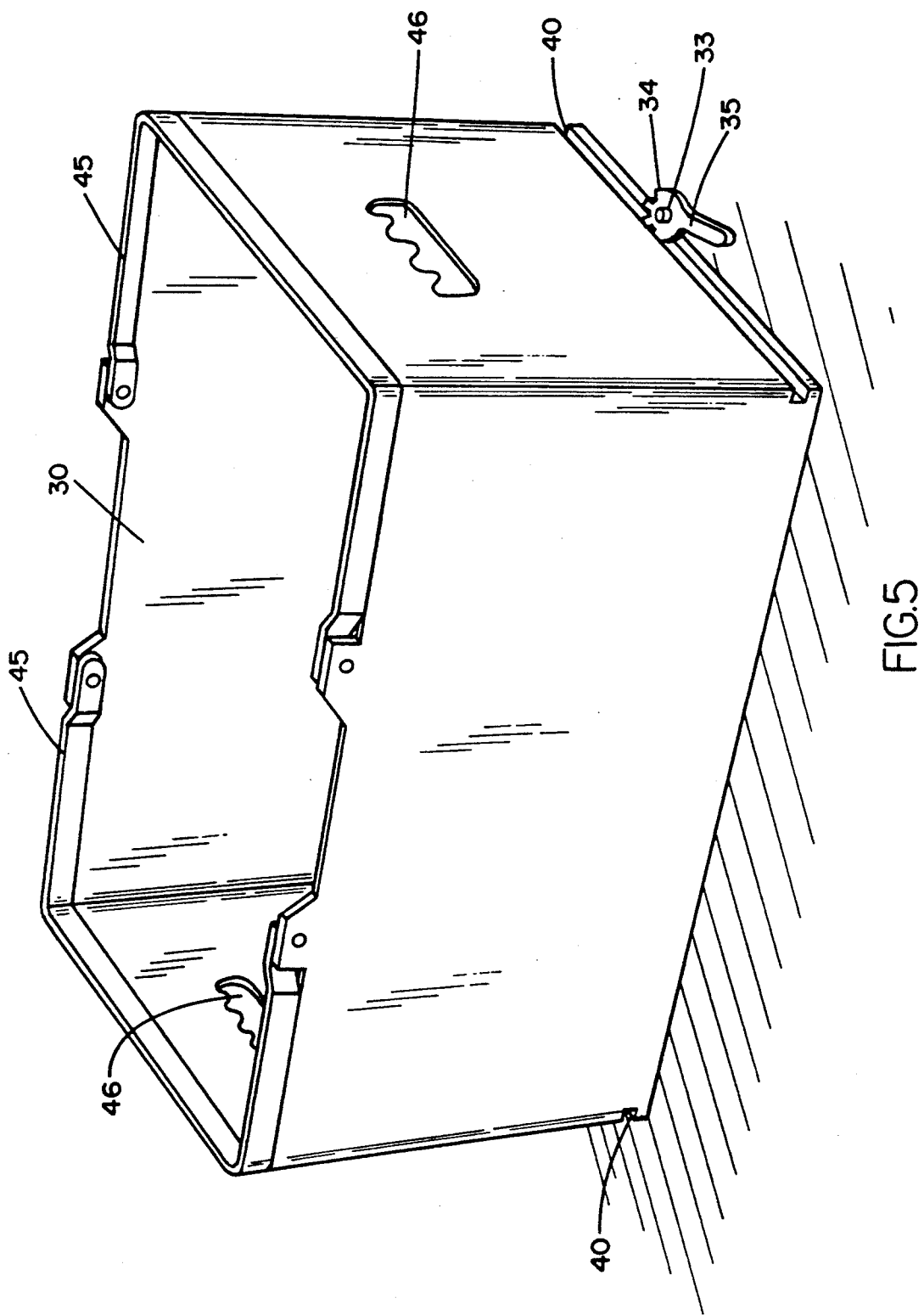
FIG. 5 is a perspective view of a container in use with a boot insert.

At least one, and in this case, both insert portions 2, 3 are provided with anchoring means for releasably anchoring a container such as a container 30 illustrated in FIGS. 3 to 5 to the insert. In this case there are a number of anchoring means 31 spaced-apart on each insert portion 2, 3. The anchoring means may be releasably mounted to the insert portions 2, 3 the base 5 the insert portions 2, 3 being provided with blanks or a suitable receiving means for mounting the anchoring means to the insert at any desired number of locations.

In more detail, each anchoring means 31 comprises a screw 33 which engages a threaded insert in a bore in the base 5 of the insert portion 2, 3. The screw 33 has an enlarged head 34 defining a cam surface and an extension defining a handle 35 for operating the anchoring means 31. The cam surface of the screw head 34 is engagable with a camming surface of the container 30. In this case the camming surface is defined by an elongate groove 40 in opposed end walls of the container 30 and adjacent a base thereof for anchoring the container 30 to the insert at a desired location.

In use, the container 30 is mounted between a pair of anchoring means with the groove 40 in line with the screw head 34. The container is then manipulated into a desired position at which point the screws 33 are turned by operating the handles 35 to engage the camming surface of the screw head 34 in the groove 40 to anchor the container 30 the insert. To remove or adjust the position of the container the procedure is reversed. The camming surface of the screw head 34 and indeed alternatively or additionally the groove 40 of the container may be provided with friction engagement means for example, in the form of toothed formations to assist in locking the container in a desired position.

In more detail, the container 30 includes carrying handles 45 and recesses 46 defining handle portions. It will be appreciated that the container may be of any desired shape and configuration, however, in this case it is particularly adapted for carrying files and the like.

It will be appreciated that while the anchoring means has been described with reference to a boot insert having two or more parts it is possible that it may be applicable to one-piece boot inserts. Similarly while the container has been described for use with the particular insert illustrated it will be appreciated that it may possibly be used with other inserts and possibly other anchoring means.

These and many other variations and modifications on the invention will be readily apparent and accordingly the invention is not limited to the embodiments hereinbefore described which may be varied in both construction and detail.

We claim:
1. A removable motor vehicle boot insert comprising;
at least two associated substantially rigid boot insert portions,
each insert portion comprising a base and a side wall means extending upwardly from the base and defining an open-topped container, said side wall means including a boot engaging side section, a front end-wall section, and a rear end-wall section and
engagement means for engagement of the insert portions,
the engagement means of each insert portion having a raised flange section opposite the boot engaging side section,
one of the respective flange sections of the boot insert portions overlapping the other on assembly and the boot insert substantially following the contour of a motor vehicle boot on assembly of the insert portions within the boot.
2. A boot insert as claimed in claim 1, said side section including integral retaining means for retaining the insert in position in a boot.
3. A boot insert as claimed in claim 2 wherein the retaining means comprises a flexible wing portion on the boot engaging the side section of each insert portion for engagement with the wall of a vehicle boot to urge the insert portions into engagement, on assembly.
4. A boot insert as claimed in claim 1 having anchoring means for releasably anchoring a container to the insert.
5. A boot insert as claimed in claim 4 wherein the anchoring means comprises an anchoring member having an engagement portion which is movable from a disengaged position allowing movement of the container on the insert to an anchoring position engaged with the container.
6. A boot insert as claimed in claim 5 wherein the anchoring member is releasably mounted on the insert.
7. A boot insert as claimed in claim 5 wherein the anchoring member comprises a screw having a cam surface for engagement with a camming surface of the container.
8. A boot insert as claimed in claim 7 wherein the cam surface is defined by the head of the screw and the head includes an extension forming a handle for movement of the screw.

9. A boot insert as claimed in claim 7 wherein the cam surface of the container comprises a recess adjacent a base of the container.

10. A boot insert as claimed in claim 9 wherein the recess is formed by a longitudinally extending groove for anchoring a container to the insert at a desired location.

11. A boot insert as claimed in claim 5 wherein the insert portions are formed with a plurality of spaced-apart locating portions for mounting said anchoring members in desired position on the insert, the container being retained by engagement between a pair of spaced-apart anchoring members embracing a container therebetween.

12. A boot insert for a vehicle as claimed in claim 1 wherein the base includes anchoring means for anchoring a container to the insert, the anchoring means comprising a screw having a cam surface for engagement with a camming surface of a container to retain the container in a desired position on the insert.

13. A removable motor vehicle boot insert as claimed in claim 1 further including a container for use therewith, the container comprising a bottom and side wall means upstanding from the bottom wherein the container has engagement means for engagement by an anchoring means for anchoring the container to the boot insert.

* * * * *